US011535079B2

(12) United States Patent
Italiano et al.

(10) Patent No.: US 11,535,079 B2
(45) Date of Patent: Dec. 27, 2022

(54) TORSION BEAM AXLES FOR VEHICLES

(71) Applicant: FORD GLOBAL TECHNOLOGIES, LLC, Dearborn, MI (US)

(72) Inventors: Francesco Italiano, Kelmis (BE); Carsten Tragsdorf, Wegberg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/921,572

(22) Filed: Jul. 6, 2020

(65) Prior Publication Data

US 2021/0001680 A1 Jan. 7, 2021

(30) Foreign Application Priority Data

Jul. 3, 2019 (DE) .......................... 102019209784.7

(51) Int. Cl.
*B60G 21/05* (2006.01)

(52) U.S. Cl.
CPC ........ *B60G 21/052* (2013.01); *B60G 2200/21* (2013.01); *B60G 2206/201* (2013.01); *B60G 2206/202* (2013.01)

(58) Field of Classification Search
CPC ................ B60G 21/052; B60G 21/051; B60G 2206/202; B60G 2206/201; B60G 2200/21; B60G 2206/20
See application file for complete search history.

(56) References Cited

U.S. PATENT DOCUMENTS

| 8,474,511 | B2 | 7/2013 | Simon |
| 8,899,624 | B2 | 12/2014 | Kotagiri et al. |
| 8,905,118 | B2 | 12/2014 | Charest et al. |
| 10,000,238 | B2 | 6/2018 | Buschjohann et al. |
| 2011/0081197 | A1 | 4/2011 | Buschjohann et al. |
| 2017/0203629 | A1* | 7/2017 | Womack .................. B60B 35/04 |

FOREIGN PATENT DOCUMENTS

| CN | 102556177 | A | | 7/2012 | |
| CN | 108688427 | A | * | 10/2018 | ........... B60G 21/051 |
| DE | 4441971 | A1 | | 5/1996 | |
| DE | 60104172 | T2 | | 7/2005 | |
| DE | 102007006722 | A1 | | 12/2008 | |
| DE | 102015011707 | A1 | * | 3/2017 | ........... B60G 21/051 |
| DE | 102015220240 | A1 | * | 4/2017 | ........... B60G 21/051 |
| DE | 102015223808 | A1 | * | 6/2017 | ........... B60G 21/051 |

(Continued)

OTHER PUBLICATIONS

Machine translation of DE102015223808A1 from espacenet.com, Aug. 18, 2021.*

(Continued)

*Primary Examiner* — Paul N Dickson
*Assistant Examiner* — Maxwell L Meshaka
(74) *Attorney, Agent, or Firm* — Gregory Brown; Hanley, Flight & Zimmerman LLC

(57) ABSTRACT

Torsion beam axles for vehicles are disclosed. An example torsion beam axle disclosed herein includes a first side assembly, the first side assembly including a longitudinal member and a receiver. The example torsion beam axle further including a second side assembly, and a cross strut extending transversely between the first side assembly and the second side assembly.

10 Claims, 3 Drawing Sheets

(56) References Cited

FOREIGN PATENT DOCUMENTS

| | | | |
|---|---|---|---|
| DE | 102016206283 A1 | 10/2017 | |
| EP | 2357097 A1 | 8/2011 | |
| FR | 2745240 A1 * | 8/1997 | ........... B60G 21/051 |
| JP | 2003025821 A * | 1/2003 | |
| KR | 20130013147 A * | 2/2013 | |
| WO | WO-2006030921 A1 * | 3/2006 | ........... B60G 21/051 |
| WO | WO-2016011092 A1 * | 1/2016 | ........... B60G 21/051 |
| WO | WO-2016061078 A1 * | 4/2016 | ........... B60G 21/051 |

OTHER PUBLICATIONS

Machine translation of DE102016206283A1 from espacenet.com, Aug. 18, 2021.*
JP 2003025821 A machine translation from espacenet.com, Apr. 2022.*
FR 2745240 A1 machine translation from espacenet.com, Apr. 2022.*
Honda, "2017 Acura NSX Press Kit—Space Frame and Body Panels," Published Mar. 14, 2016, retrieved from [http://hondanews.com/channels/nsxpresskit/releases/2017acuransxpresskitspaceframeandbodypanels] on Sep. 18, 2018, 9 pages.
German Patent and Trademark Office, "Research Report," dated Mar. 24, 2020 in connection with German Patent Application No. 10 2019 209 784.7, 7 pages.

* cited by examiner

TORSION BEAM AXLES FOR VEHICLES

RELATED APPLICATION

This patent claims priority to German patent application no. 102019209784.7, which was filed on Jul. 3, 2019, and was entitled "Verbundlenkerachse mit mehrteiligem Langslenker." German patent application no. 102019209784.7 is hereby incorporated herein by reference in its entirety.

FIELD OF THE DISCLOSURE

This disclosure relates to generally to suspension systems and, more particularly, to torsion beam axles for vehicles.

BACKGROUND

In automotive engineering, various configurations for rear wheel axles are used including, for example, torsion beam axles and twist beam axles. Torsion beam axles often include longitudinal members and a cross member. More specifically, torsion beam axles include torsionally and flexurally rigid longitudinal members (e.g., longitudinal links, etc.) which are coupled together via a likewise rigid and torsionally flexible cross member with a U-shaped, T-shaped, and/or V-shaped profile. The torsionally flexible configuration of the cross member permits the twisting of the longitudinal links relative to one another. At the same time, the cross member acts as a stabilizer. In twist beam axles, the longitudinal links are welded to one another approximately in their center via a downwardly open U profile.

Current rear wheel suspensions consist of open, reinforced cross struts which are welded to longitudinal links. The required rigidity of such rear wheel suspensions often requires a considerable number of thick-walled reinforcements and/or which are connected to the main components by metal welding with inert gases (e.g., MIG welding, etc.).

SUMMARY

An example torsion beam axle disclosed herein includes a first side assembly, the first side assembly including a first longitudinal member and a first receiver a second side assembly, and a cross strut extending transversely between the first side assembly and the second side assembly.

An example vehicle frame disclosed herein includes a first wheel, a second wheel, and a torsion beam axle coupled between the first wheel and the second wheel, the torsion beam axle including a cross strut, a first side assembly, the first side assembly including a first longitudinal member and a first receiver, and a second side assembly.

Figure 1:
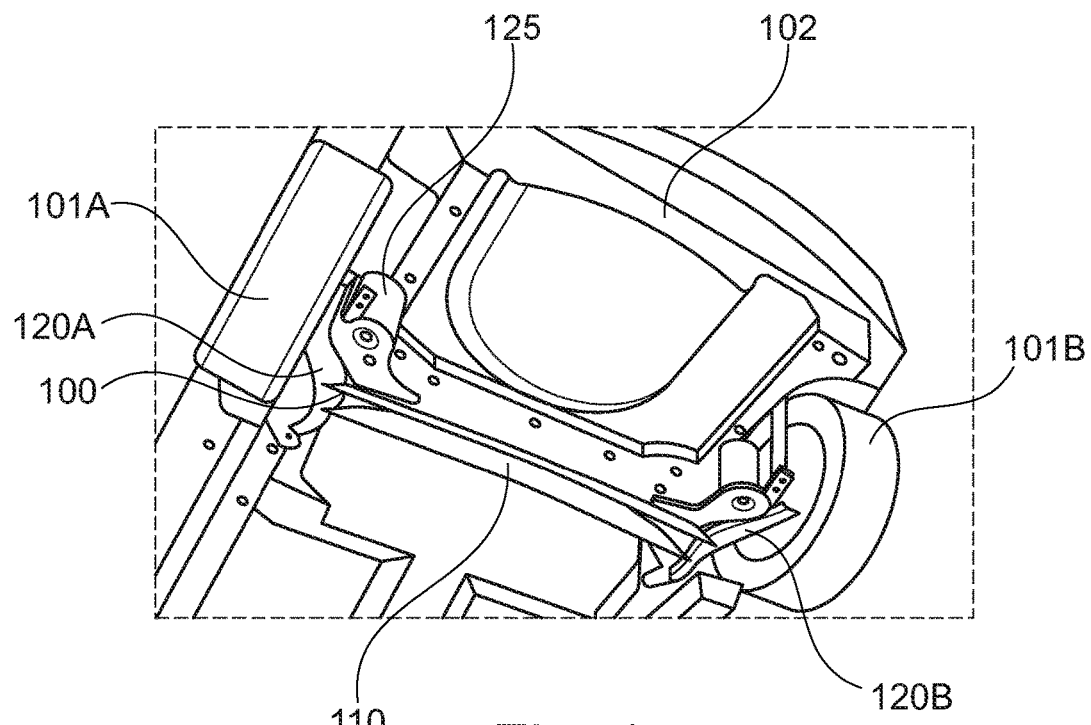
FIG. 1 illustrates a prior art torsion beam axle for the rear wheels of a motor vehicle.

The figures are not to scale. Instead, the thickness of the layers or regions may be enlarged in the drawings. In general, the same reference numbers will be used throughout the drawing(s) and accompanying written description to refer to the same or like parts. Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore provided to describe an exemplary implementation and not to be taken limiting on the scope of the subject matter described in this disclosure. Certain features from different aspects of the following description may be combined to form yet new aspects of the subject matter discussed below.

As used herein, the orientation of features, forces and moments are described with reference to the longitudinal, vertical, and traverse axis of the vehicle associated with the features, forces and moments. As used herein, the term "longitudinal" refers to directions parallel to the direction of travel of the vehicle. As used herein, the term "vertical" refers to directions normal to the ground. As used herein, the term "transverse" refers to directions perpendicular to the longitudinal and vertical directions.

As used herein, "longitudinally" identifies components which extend substantially along a longitudinal direction of the vehicle. As used herein, transversely" identifies components which extend substantially along a transverse direction of the vehicle. As used herein, the term "cross strut" is any cross member in the region of the rear wheel axle. As used herein, the term "longitudinal member" includes any longitudinal strut in the region of the rear wheel axle. As used herein, the term "longitudinal link portion" can include one or more longitudinal link portions, unless indicated otherwise. As used herein, the term "two-part design" is refers to assemblies/designs with at least two parts (e.g., multi-part designs, etc.).

"Including" and "comprising" (and all forms and tenses thereof) are used herein to be open-ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Currently, the side portions (e.g., longitudinal links, etc.) of a twist beam suspension system are designed as single unitary parts. The single-part steel design of the side portions prevents using new or alternative materials. In some examples, vehicle torsion beam axle suspension systems are specifically designed for a particular vehicle model and/or chassis, which prevents the modular construction and scalability of the suspension system. Additionally, the specific tailoring of the twist beam suspension system reduces allowable tolerances, which increases the costs and production time of the assembly and/or the production of the suspension system. As used herein, the terms "twist beam" and "torsion beam" are used interchangeably.

Examples disclosed herein overcome the above-noted deficiencies and include torsion beam axles for rear-wheel pairs with multi-part side assemblies, which reduces the overall weight of the rear axle and increases the modularity of the individual components of the torsion beam. Examples disclosed herein includes a torsion beam axle for a rear-wheel pair of a motor vehicle with two side assemblies and a cross strut arranged between the side assemblies. Some examples disclosed herein include a torsion beam axle for a rear-wheel pair of a motor vehicle, which has two side assemblies, wherein the two side assemblies each include a longitudinal member for connection to a wheel carrier, and a receiver for connection to the vehicle. In some examples disclosed herein, the side assemblies include at least two parts and/or components (e.g., the receiver and the longitudinal member, etc.).

In some examples disclosed herein, the side assemblies are pivotably connected to the vehicle frame, to a subframe of the frame, and/or to the vehicle body via the receiver. In some examples disclosed herein, the side assemblies are fixedly connected to a wheel carrier of the vehicle via the longitudinal member. The two-part and/or multi-part design of the side assemblies permits the integration of multiple new materials (e.g., metals, ceramics, polymers, etc.) into the torsion beam axle. In such examples, the side assemblies can include parts composed of light-weight materials (e.g., aluminum, composite materials, plastics, polymers, ceramics, etc.) and parts composed of comparatively stronger materials (e.g., steel, cast iron, etc.). In such examples, this design reduces the overall weight of the torsion beam axle by enabling parts exposed to less stress to be composed of lighter materials. In some examples, the two-part design of the side assembly enables a modular construction, which facilitates scaling of the torsion beam axle and customization for specific vehicle/customer requirements. In some examples disclosed herein, the two-part design of the torsion beam enables better compensation of tolerance deviations, which enables new manufacturing/assembly techniques to be used during the assembly of the torsion axles.

In some examples disclosed herein, the receivers of the side assemblies include one or more aluminum cast connection pieces. In some examples, the side assemblies can be composed of any other suitable material or combination thereof. In some examples disclosed herein, some or all of the parts are composed of aluminum, which contributes to reducing the total weight of the vehicle body and/or the sprung mass of the vehicle. In some examples disclosed herein, the design as a cast part enables cost-effective production. In some examples disclosed herein, the side assemblies include targeted reinforcements and/or bracings to compensate for local stresses and/or mechanical strain. In some examples disclosed herein, the cast connection piece can also be further machined after casting. In some examples disclosed herein, bushings or sleeves can be provided in the second receivers portion for connection to further components. The connection piece can be formed as an individual cast part or from a plurality of cast parts.

In some examples disclosed herein, the longitudinal members of the side assemblies and/or the cross strut are manufactured via extrusion and have a tubular cross-section (e.g., an extruded hollow profile, etc.). In some such examples, during the extrusion of the longitudinal members and/or the cross strut, firm or viscous curable masses are continuously squeezed out under pressure from a shaping nozzle or die to the desired length. In such examples, production of the first longitudinal link and/or the cross strut via ACCRA® technology. In some examples disclosed herein, the first longitudinal member and/or the cross strut have a rectilinear profile and/or a curved profile. In such examples, the profile of the longitudinal members and/or cross strut facilitates the modular construction and the scalability of the torsion beam axle. In some examples disclosed herein, at least one component composed of a different material (e.g., metal, aluminum, fiberglass, and/or other composite materials, etc.) can be incorporated into the longitudinal link or the cross strut. In some such examples, the component(s) integrated in the longitudinal members and/or cross strut can be used for stabilization of the axle and/or weight reduction.

In some examples disclosed herein, to facilitate rapid and cost-effective installation, the receiver includes a first insertion opening for forming a first plug-in connection with the longitudinal member. In some examples disclosed herein, the receiver portion includes at least one second insertion opening for forming at least one second plug-in connection with the cross strut. In such examples, the plug-in connections are press fit connections. Additionally or alternatively, any other fastening/joining techniques may be used to join the cross strut and/or longitudinal member to the receiver (e.g., fasteners, welding, a chemical adhesive, etc.).

In some such examples, the longitudinal member and/or the cross member can be inserted into the receiver and, via the overlapping region, can form a force-fitting and/or form-fitting plug-in connection (e.g., a press fit, etc.). To prevent rotation of the longitudinal member or of the cross strut about the plug-in connection, the outer profiles of the longitudinal member and/or cross strut are not rotationally symmetrical, but rather are, for example, angular. In some examples disclosed herein, the geometry of the outer profile and/or the cross-sectional profile can be trapezoidal. Additionally or alternatively, the plug-in connections can be formed via other fastening (e.g., via bolts, via rivets, etc.) and/or joining methods (e.g, clamping, welding, etc.).

In some examples disclosed herein, to facilitate installation/assembly, the receiver includes a means for the depth control of the insertion depth in the first plug-in connection and/or of the second plug-in connection. In such examples, the depth controlling means can include a stop wall that causes a contact or a stop with an end side or an end region of the longitudinal member or of the cross member. As such, the means for depth control prevents (e.g., avoids, resists, etc.) deeper insertion of the into the longitudinal member is avoided (e.g., prevented, etc.).

In some examples disclosed herein, the second longitudinal link portion includes at least two parts (e.g., multiple parts, etc.). In some such examples, the receiver includes two similar parts (e.g., two half-shells, two case elements, etc.). In such examples disclosed herein, the longitudinal member and the receiver are therefore formed with at least three parts in this embodiment.

Additionally or alternatively, the receiver can includes a first casing element including a first half-shell and at least one second casing element including a second half shell. In such examples, the first and second half-shells surround the longitudinal member and/or the cross strut such that the half-shells lie flush thereagainst the longitudinal member and/or cross strut. In some examples disclosed herein, the first and second half-shells surround the longitudinal member and/or cross strut with respect to a vertical axis of the vehicle. Additionally or alternately, the connection between the first and second half-shells can be secured by further fastening or joining methods, for example by clamping or welding.

In some examples disclosed herein, the cross strut and longitudinal members of the side assemblies are formed together (e.g., as a unitary component, etc.) as an integral torsion axle beam. As such, some examples disclosed include relatively few components when compared to prior art torsion axle beams. The longitudinal members form the respective sides of a U-shape, such that the cross strut is disposed in between the longitudinal portions form the central portion of the U-shape. In such examples, the curved connecting region (e.g., the transition region, etc.) between the cross strut and the longitudinal member is disposed thereto in a form-fitting manner and/or force-fitting manner (e.g., a press fit, etc.) by the half-shells. In such examples, by surrounding the curved connecting region, rotation of torsion axle beam within the receiver is prevented. In some examples disclosed herein, the integral torsion axle beam is formed with a circular and/or elliptical cross-section. In some examples disclosed herein, the torsion axle beam can be composed of a composite (e.g., fiberglass, etc.) tube with a core made of metal (e.g., aluminum, etc.).

Turning now to the figures, FIG. 1 illustrates a torsion beam axle 100 composed of a metal (e.g., steel, etc.) for a rear-wheel pair 101A, 101B of a motor vehicle 102. The torsion beam axle 100 includes a reinforced cross strut 110, which is respectively welded at both ends to example longitudinal links 120A, 120B. The longitudinal links 120A, 120B have first portions for connection to wheel carriers (e.g., the wheel carrier 125 of FIG. 1) of the rear wheel pair 101A, 101B and second portions for connection to the motor vehicle 102 (e.g., to the vehicle frame, to a subframe, the vehicle body, etc.).

Figure 2:
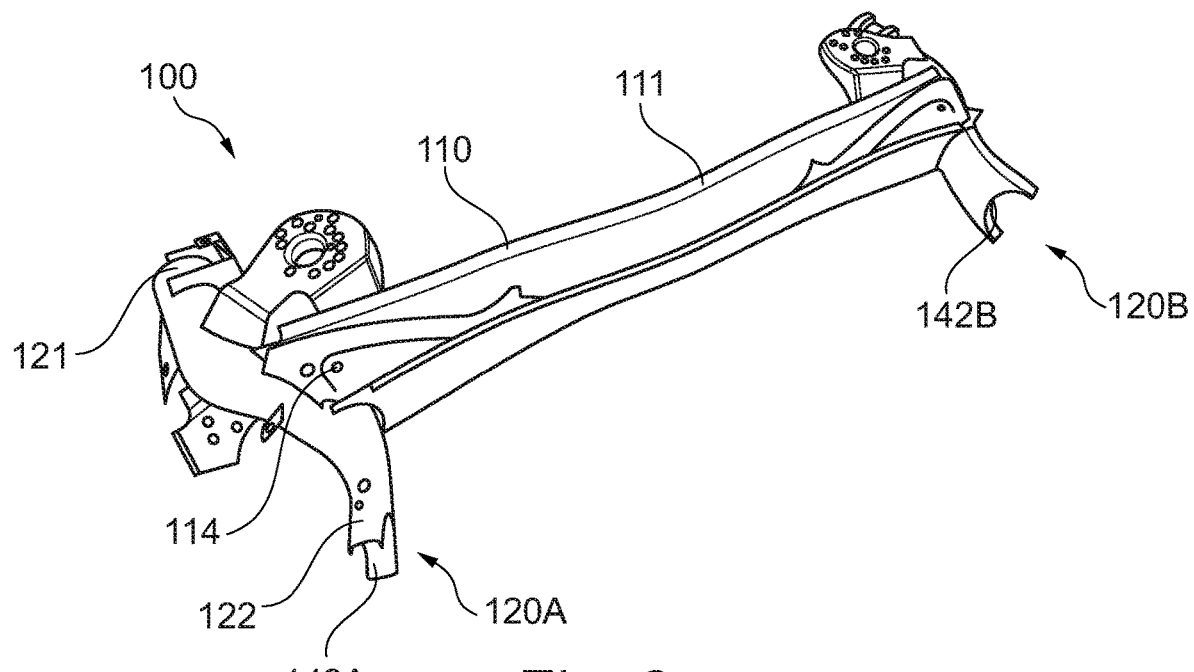
FIG. 2 illustrates the prior art twist beam suspension assembly of FIG. 1.

FIG. 2 illustrates the torsion beam axle 100 of FIG. 1 with the two longitudinal links 120A, 120B, and a cross strut 110 for connecting the longitudinal links 120. The longitudinal links 120A, 120B each have a first longitudinal link portion 121 for connection to a wheel carrier (e.g., the wheel carrier 125 of FIG. 1, etc.) and a second longitudinal link portion 122 for connection to a vehicle (e.g., the vehicle 102 of FIG. 1, etc.). The required rigidity for such a rear wheel axle concept is achieved by thick-walled bracings 111 and reinforcements. The cross strut 110 is welded to the two longitudinal links 120A, 120B, reinforced by an additional connecting piece 114 in each case. The longitudinal links 120A, 120B have respective example receiving devices 142A, 142B. In FIG. 2, the first receiving device 142A is included in the second longitudinal link portion 122 for receiving a sleeve and/or bushing for connection to the vehicle 102.

Figure 3:
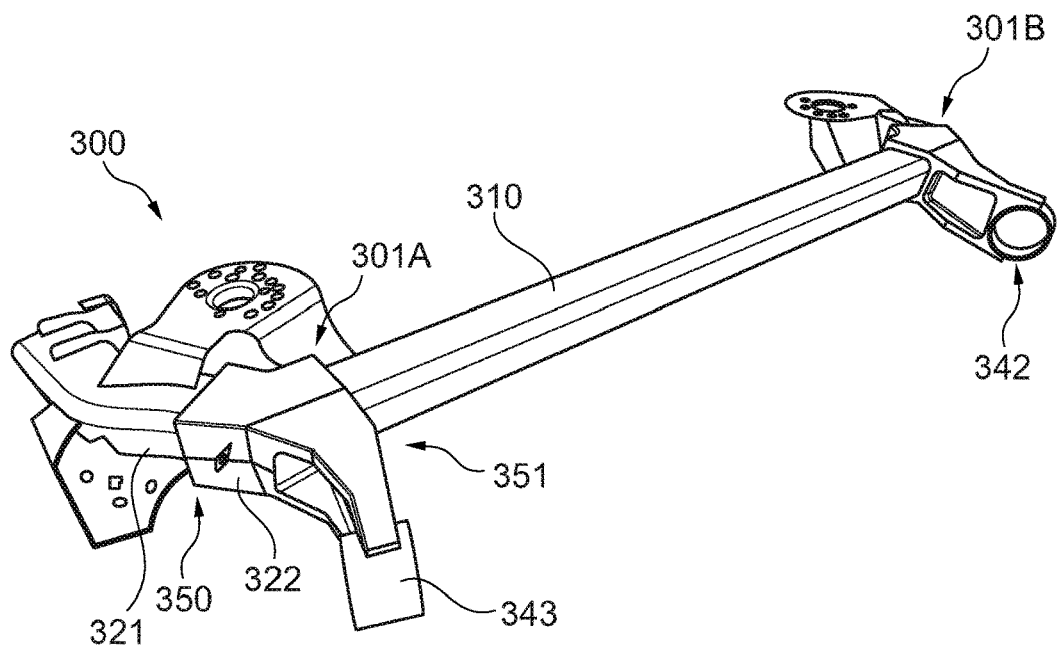
FIG. 3 illustrates a perspective view of an example twist beam suspension assembly for a rear wheel pair in a first exemplary embodiment of the invention.
Figure 4:
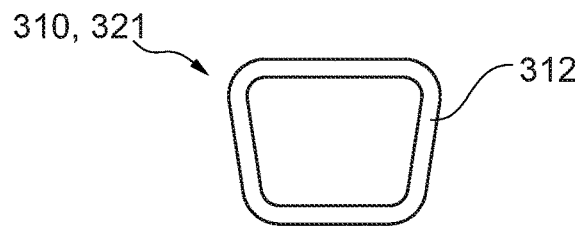
FIG. 4 illustrates a cross-sectional view of the cross member of the twist beam suspension assembly of FIG. 3.
Figure 5:
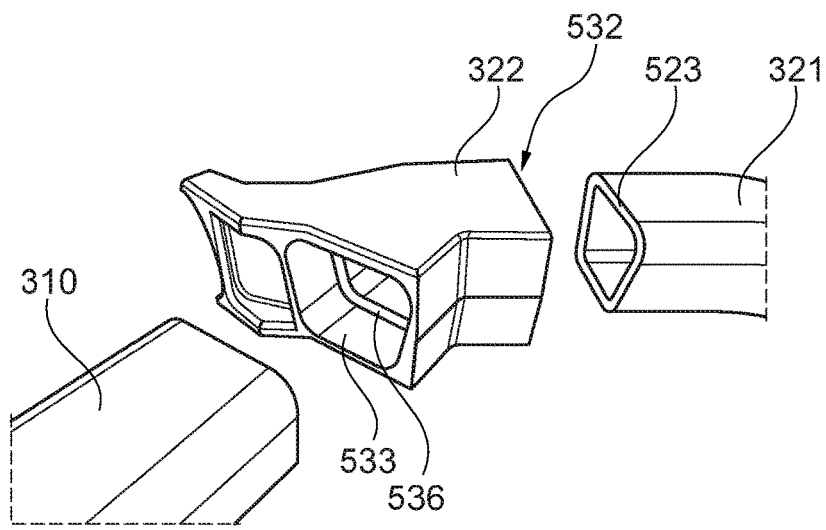
FIG. 5 illustrates an exploded perspective view of the connection piece of the twist beam suspension assembly of FIG. 3.

Turning now to FIGS. 3-5, FIGS. 3-5 illustrate an example twist beam suspension axle 300, which includes an example first side assembly 301A, an example second side assembly 301B, and an example cross strut 310. In the illustrated example of FIG. 3, the first side assembly 301A is formed with two parts, an example longitudinal member 321 and an example receiver 322. In the illustrated example of FIG. 3, the second side assembly 301B includes substantially similar parts (e.g., a second receiver and a second longitudinal member, etc.) as the first side assembly 301A. In other examples, the first side assembly 301A can be formed with any number of parts (e.g., 2 parts, 3 parts, 4 parts, etc.). In the illustrated example of FIG. 3, the longitudinal member 321 and the cross strut 310 are manufactured via extrusion.

FIG. 4 illustrates a cross-sectional view of the cross strut 310 and/or the longitudinal member 321 of the twist beam suspension assembly of FIG. 3. In the illustrated example of FIG. 4, the cross strut 310 and/or the longitudinal member 321 have an extruded hollow profile 312 with a trapezoidal cross-section. In other examples, the cross strut 310 and the longitudinal member 321 can have any other non-rotatably symmetrical cross-section. In some examples, the cross strut 310 and the longitudinal member are composed of aluminum. In other examples, the cross strut 310 and/or the longitudinal member 321 can have any other suitable cross-section.

In the illustrated example of FIG. 3, the receiver 322 forms a first plug-in connection 350 (e.g., a press fit connection, etc.) to the longitudinal member 321 and at least one second plug-in connection 351 to the cross strut 310. In the illustrated example of FIG. 3, the receiver 322 is a connection piece. In some examples, the receiver is a cast part (e.g., cast aluminum, another comparatively light-weight metal, etc.). In the illustrated example of FIG. 3, the receiver 322 forms the first plug-in connection 350 to the longitudinal member 321 and the second plug-in connection 351 to the cross strut 310. A sleeve/bushing 343 includes a receiving device 342 is facilitate connection to a vehicle (e.g., the vehicle 102 of FIG. 1, etc.). As such, the receiver 322 functions as a connection piece (e.g., a structural connection, a hub, etc.) for the longitudinal member 321 and for the cross strut 310 to a vehicle (e.g. the vehicle body, the vehicle frame, a subframe, etc.).

FIG. 5 illustrates an exploded perspective view of the connection piece of the twist beam suspension assembly of FIG. 3. In the illustrated example of FIG. 5, the receiver 322 has an example first insertion opening 532 for forming the first plug-in connection 350 with the longitudinal member 321 and a second insertion opening 533 for forming the second plug-in connection 351 with the cross strut 310. The example plug-in connections 350, 351 are press fits. In some examples, to facilitate the formation of the plug-in connections 350, 351, the receiver 322 includes a stop wall 536 (e.g., a means for depth control, etc.). In some examples, the stop wall 536 forms a, flat, abutting contact with end walls 523 of the extruded strands of the longitudinal member 321 and/or of the cross strut 310. In some examples, the receiver 322 is formed integrally (e.g., as a single part, etc.).

Figure 6:
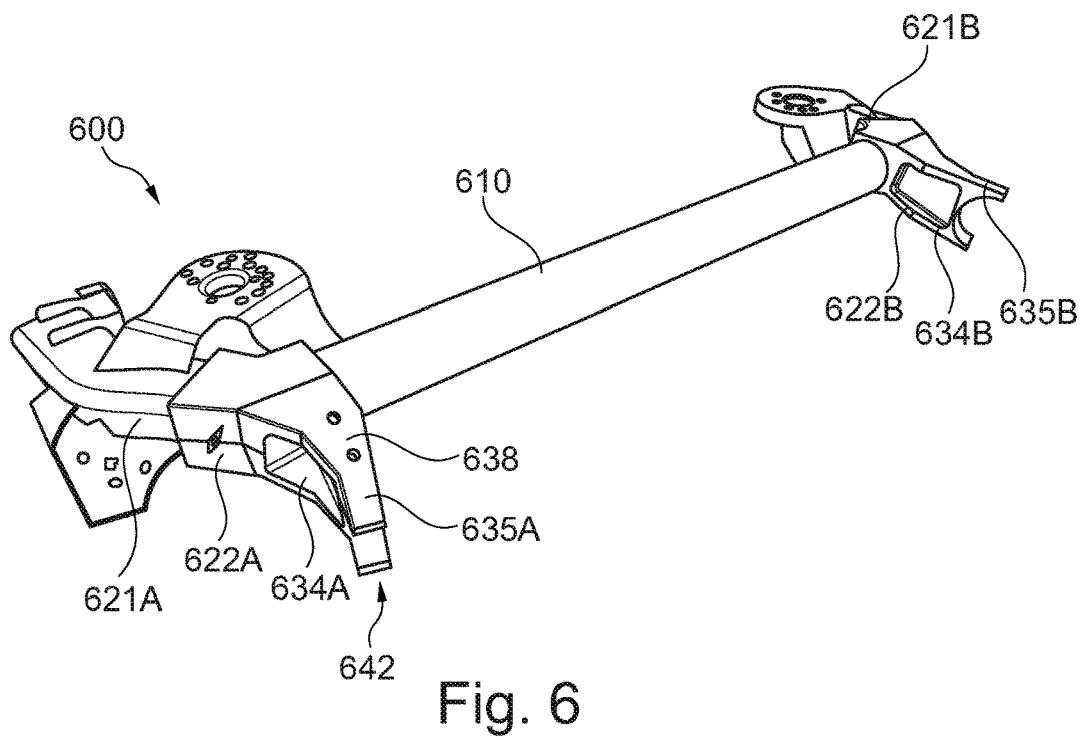
FIG. 6 illustrates a perspective view of an alternative twist beam assembly for a rear wheel pair.
Figure 7:
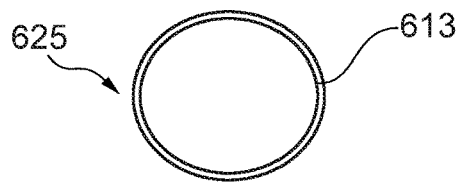
FIG. 7 illustrates a cross-sectional view of the cross member of the twist beam suspension assembly of FIG. 6.
Figure 8:
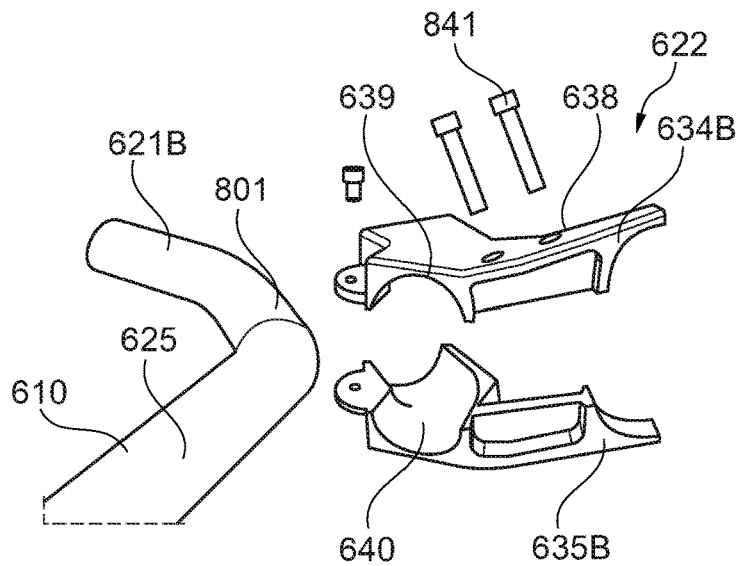
FIG. 8 illustrates an exploded perspective view of the connection piece of the twist beam suspension assembly of FIG. 6.

FIGS. 6-8 illustrate an alternative twist beam axle 600 for a rear-wheel pair. In the illustrated example of FIG. 6, a first receiver 622A is also formed in two parts as two casing elements 634A, 635A, wherein in a first casing element 634A, with a first half-shell 639 and at least one second casing element 635A, with a second half-shell 640, surround a first longitudinal member 621A and/or a cross strut 610 in a manner lying flush (e.g., flat, etc.) thereagainst. The example two casing elements 634A, 635A are preferably arranged one above the other with respect to a vehicle vertical. The alternative twist beam axle 600 further includes a second receiver 622B which is formed as two casing elements 634B, 635B. In the illustrated example of FIG. 6, the first receiver 622A is substantially similar to and symmetrical to the first receiver 622A. In some examples, the casing elements 634A, 635A include at least one example fastening portion 638 for connecting the casing elements 634A, 635A to each other. The fastening portion 638 can include drill holes and/or other fastener-receiving features to receive fasteners. In some examples, the fastening portion 638 can include a receiving device 642 for sleeves and/or bushings.

The cross strut 610 with the two longitudinal members 621A, 621B can form a single, integral torsion axle beam 625 bent in a U-shaped manner. That is, in the illustrated example of FIG. 6, the two longitudinal members 621A, 621B and cross strut 610 are a unitary part. In other examples, the torsion axle beam 625 can be composed of multiple components. In the illustrated example, the torsion axle beam 625 includes a curved transition region 801 between the first longitudinal member 621A oriented in the longitudinal direction of the vehicle and the cross strut 610 oriented in the transverse direction of the vehicle. In the illustrated example of FIG. 8, the first half-shell 639 of the first casing element 634A and the second half-shell 640 of the second casing element 635A lie substantially flush (e.g., flat, etc.) against the transition region, which reduces (e.g., prevents) rotation or slipping between the torsion axle beam 625 and the receiver 622. In the illustrated example of FIG.

7, the torsion axle beam 625 includes an example elliptical cross-sectional profile 613. In other examples, the torsion axle beam 625 can any other suitable cross-section (e.g., a circular cross-sectional profile, etc.). In the illustrated example of FIG. 8, the fastening portions 638 include screw holes to receive screws 841, which couple casing elements 634A, 635A to each other.

Torsion beam axles for vehicles are disclosed herein. Further examples and combinations thereof include the following:

Example 1 includes a torsion beam axle including a first side assembly, the first side assembly including a longitudinal member and a receiver, a second side assembly, and a cross strut extending transversely between the first side assembly and the second side assembly.

Example 2 includes the torsion beam axle of example 1, wherein the receiver couples the cross strut to the longitudinal member.

Example 3 includes the torsion beam axle of example 2, wherein the receiver forms a first press fit connection with the cross strut and the receiver forms a second press fit connection with the longitudinal member.

Example 4 includes the torsion beam axle of example 2, wherein the receiver includes a stop wall to control a depth of an insertion of the cross strut into the receiver.

Example 5 includes the torsion beam axle of example 1, wherein the cross strut and the longitudinal member have substantially the same cross-section.

Example 6 includes the torsion beam axle of example 1, wherein the cross strut has a trapezoidal cross-section.

Example 7 includes the torsion beam axle of example 1, wherein the receiver surrounds a first portion of the cross strut and a second portion of the longitudinal member, the receiver including a first half-shell, and a second half-shell.

Example 8 includes the torsion beam axle of example 7, wherein the longitudinal member and the cross strut are a unitary part.

Example 9 includes the torsion beam axle of example 8, wherein the unitary part has an elliptical cross-section.

Example 10 includes the torsion beam axle of example 1, wherein the receiver includes a sleeve, the sleeve to facilitate coupling of the torsion beam axle to a vehicle frame.

Example 11 includes a vehicle, comprising a vehicle frame, a first wheel, a second wheel, and a torsion beam axle coupled between the first wheel and the second wheel, the torsion beam axle including a cross strut, a first side assembly, the first side assembly including a longitudinal member and a receiver, and a second side assembly.

Example 12 includes the vehicle of example 11, wherein the receiver couples the cross strut to the longitudinal member.

Example 13 includes the vehicle of example 12, wherein the receiver forms a first press fit connection with the cross strut and the receiver forms a second press fit connection with the longitudinal member.

Example 14 includes the vehicle of example 12, wherein the receiver includes a stop wall to control a depth of an insertion of the cross strut into the receiver.

Example 15 includes the vehicle of example 11, wherein the cross strut and the longitudinal member have substantially the same cross-section.

Example 16 includes the vehicle of example 11, wherein the cross strut has a trapezoidal cross-section.

Example 17 includes the vehicle of example 11, wherein the receiver surrounds a first portion of the cross strut and a second portion of the longitudinal member, the receiver including a first half-shell, and a second half-shell.

Example 18 includes the vehicle of example 17, wherein the longitudinal member and the cross strut are a unitary part.

Example 19 includes the vehicle of example 18, wherein the unitary part has an elliptical cross-section.

Example 20 includes the vehicle of example 11, wherein the receiver includes a sleeve, the sleeve to facilitate coupling of the torsion beam axle to a vehicle frame.

It is noted that this patent claims priority from German Patent Application Serial Number 102019209784.7, which was filed on Jul. 3, 2019, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A torsion beam axle including:
   a first side assembly, the first side assembly including:
      a longitudinal member; and
      a receiver including a cavity, the cavity including:
         a first opening receiving the longitudinal member; and
         a second opening;
   a second side assembly; and
   a cross strut extending transversely between the first side assembly and the second side assembly, the cross strut received by the second opening.

2. The torsion beam axle of claim 1, wherein the receiver forms a first press fit connection with the cross strut and the receiver forms a second press fit connection with the longitudinal member.

3. The torsion beam axle of claim 1, wherein the receiver includes a first stop wall disposed in the second opening to control a depth of an insertion of the cross strut into the receiver.

4. The torsion beam axle of claim 3, wherein the receiver includes a second stop wall disposed in the first opening to control a depth of an insertion of the longitudinal member into the receiver.

5. The torsion beam axle of claim 1, wherein the cross strut and the longitudinal member have substantially the same cross-section.

6. The torsion beam axle of claim 1, wherein the cross strut has a trapezoidal cross-section.

7. The torsion beam axle of claim 1, wherein the cross strut has an elliptical cross-section.

8. The torsion beam axle of claim 1, wherein the receiver includes a sleeve, the sleeve to facilitate coupling of the torsion beam axle to a vehicle frame.

9. The torsion beam axle of claim 1, wherein the first opening and the second opening are not coaxial.

10. The torsion beam axle of claim 1, wherein the longitudinal member includes a rotational asymmetrical outer profile preventing rotation of the longitudinal member about the receiver.

* * * * *